US007283353B1

(12) United States Patent
Jordan et al.

(10) Patent No.: US 7,283,353 B1
(45) Date of Patent: Oct. 16, 2007

(54) SCREEN EXTENDERS

(76) Inventors: Aurellius Jordan, P.O. Box N1004, Nassau (BS); Uvalda Jordan, P.O. Box N1004, Nassau (BS)

(*) Notice: Subject to any disclaimer, the term of this patent is extended or adjusted under 35 U.S.C. 154(b) by 457 days.

(21) Appl. No.: 10/952,835

(22) Filed: Sep. 30, 2004

(51) Int. Cl.
*G06F 1/16* (2006.01)

(52) U.S. Cl. .................. 361/681; 361/683; 345/1.3; 248/122.1; 248/917

(58) Field of Classification Search .......... 361/681, 361/683; 345/1.3; 248/122.1, 917
See application file for complete search history.

(56) References Cited

U.S. PATENT DOCUMENTS

| 5,128,662 | A | * | 7/1992 | Failla | 345/1.3 |
| 5,590,021 | A | * | 12/1996 | Register | 361/681 |
| 6,295,038 | B1 | | 9/2001 | Rebeske | |
| 6,343,006 | B1 | | 1/2002 | Moscovitch | |
| 6,532,146 | B1 | * | 3/2003 | Duquette | 361/681 |
| 6,643,124 | B1 | | 11/2003 | Wilk | |
| 6,667,877 | B2 | * | 12/2003 | Duquette | 361/681 |
| 6,667,878 | B2 | * | 12/2003 | Ponx | 361/683 |
| 6,909,597 | B2 | * | 6/2005 | Tutikawa | 361/681 |
| 6,967,632 | B1 | * | 11/2005 | Minami et al. | 345/1.3 |
| 7,138,962 | B2 | * | 11/2006 | Koenig | 345/1.3 |
| 2003/0218577 | A1 | * | 11/2003 | Wang | 345/1.3 |

* cited by examiner

*Primary Examiner*—Lisa Lea-Edmonds
(74) *Attorney, Agent, or Firm*—Patent & Trademark Services, Inc.; Joseph H. McGlynn

(57) ABSTRACT

A system that allows connection of extension panels to a main output panel. The extension panels are attachable and removable from the main output panel. The extension panels receive power and/or data from electrical connectors on the main output panel, and function to extend the data display capability of the main output panel, and may be used autonomously with stored data and/or its own CPU.

11 Claims, 3 Drawing Sheets

SCREEN EXTENDERS

BACKGROUND OF THE INVENTION

The present invention relates in general to a display system, and more specifically, to a display system that extends the viewing area of a display system.

DESCRIPTION OF THE PRIOR ART

There are currently a variety of screen extension systems being utilized and proposed. Such systems include those for desktop and laptop computers. An important factor in the design of these systems is the configuration of the screen extension panel and the method of mounting it to the main screen. Screen extension panels currently available are typically permanently attached to a main screen, or are themselves a permanent part of the main screen.

In the prior art, various types of screen extension systems have been proposed.

For example, U.S. Pat. No. 6,643,124 to Wilk discloses a screen extender for a computer in which the extensions plug into the side of the main screen.

U.S. Pat. No. 6,532,146 to Duquette discloses a screen extender for a computer in which the extensions are a part of a removable housing that is dipped onto the back of the main screen and hinged to the side of the main screen.

U.S. Pat. No. 6,343,006 to Moscovitch a plurality of screens for a computer in which the screens can be connected in a variety of ways.

U.S. Pat. No. 6,295,038 to Rebeske discloses a screen extender for a computer in which the extension is hinged to the main screen.

While these extension systems accomplish their intended purpose of extending the data display area, they suffer from a number of drawbacks. For example, they are typically designed to be permanently attached to a main screen, and must be transported or otherwise accommodated even when an extension to the main screen is not required. This situation can be awkward and unnecessarily burdensome to the user, as it limits the utility of a device which, by design, is intended to be lightweight and compact.

In order to overcome these problems, what is needed is a system for extending the display area for common output panels, which is detachable and modular, thus addressing and solving problems associated with conventional systems.

SUMMARY OF THE INVENTION

The present invention is directed to extension panels that are attached to a main output panel such as those associated with, but not limited to, desktop computers, laptop computers, televisions, cell phones, etc. The extension panels are detachably secured to a main output panel. The panels receive power and/or data from electrical contact with the main output panel and function to extend the data representation capability of the main output panel.

Variations include designs in which the extension panel itself contains sufficient processing capabilities and memory capacity to permit autonomous operation. That is, the extension panel may perform data processing and representation functions independent from any attachment to, or dependence on, a main output panel or external data source.

In the description which follows, the term "display panel" shall refer to any of a number of devices for the transient visual representation of data, such as light-emitting diode (LED) and cathode ray tube (CRT) displays, plasma display panels (PDP's), and the like. The term "output panel" as used herein is not intended to be limited to such display panels, but may also include other output devices, for example audio output devices such as speakers.

It is an object of the invention disclosed herein to provide a new and improved system for extending the data representation capability of a main output panel, which provides novel utility and flexibility through the use of a unique modular design which allows one or more extension panels to be removably attached to the main output panel.

It is an object of the present invention to provide a new and improved system for extending the data representation capability of a main output panel, which provides novel utility and flexibility through the use of a unique modular design, and which further allows one or more removable extension panels to fit inside of a main output panel during storage, and project out from the main output panel for usage.

It is an object of the present invention to provide a system for extending the data representation capability of a main output panel, which is removably attachable and capable of swivel-type adjustment.

It is another object of the present invention to provide a new and improved system for extending the data representation capability of a main output panel, wherein the extension panels include sufficient memory, processing capability and power to operate autonomously when removed from all connection to the main output panel.

These and other objects and advantages of the present invention will be fully apparent from the following description, when taken in connection with the annexed drawings.

BRIEF DESCRIPTION OF THE DRAWINGS

The teachings of the present invention can be readily understood by considering the following detailed description in conjunction with the accompanying drawings, in which.

DETAILED DESCRIPTION OF EXEMPLARY EMBODIMENTS

Figure 1:
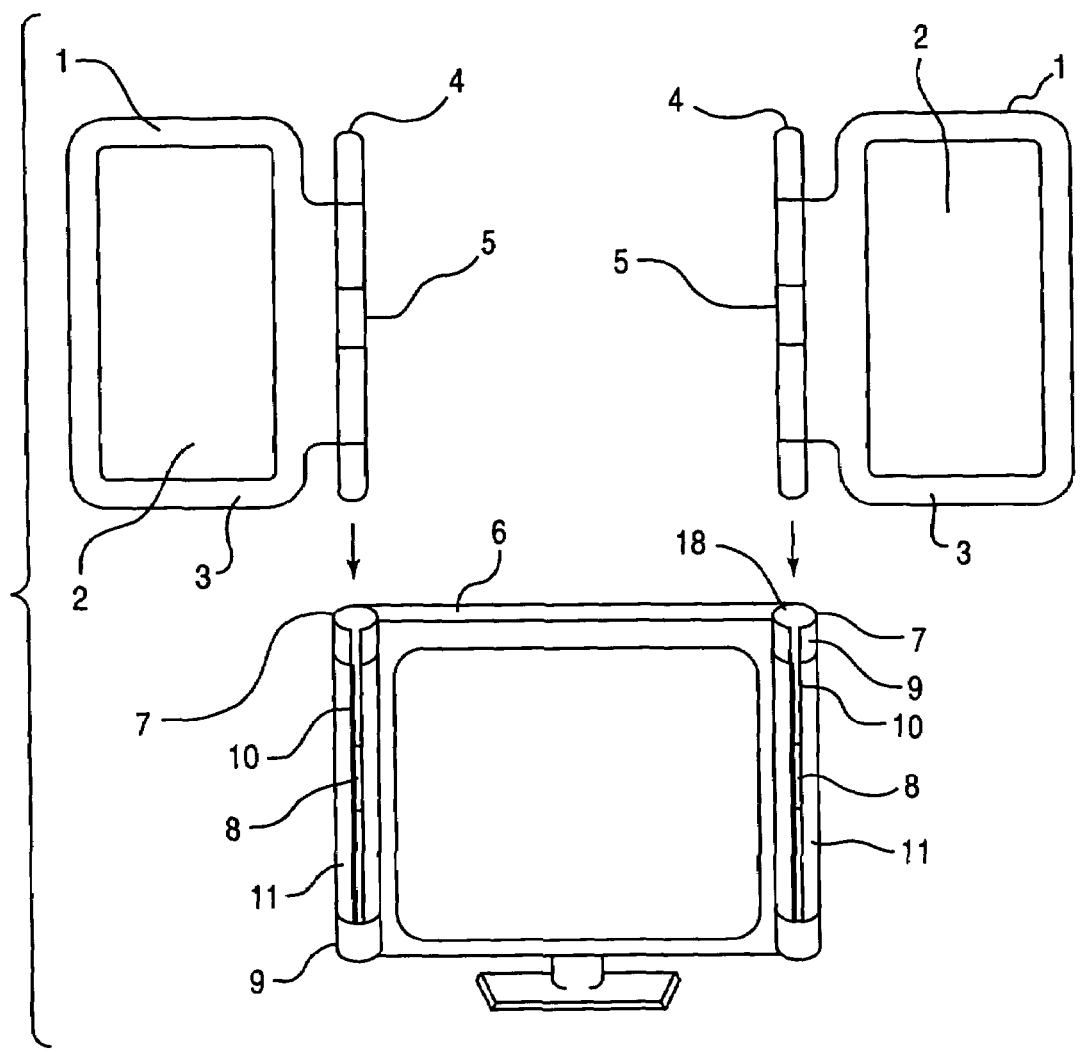
FIG. 1 shows an exploded front view of an output panel extension system.

Referring now to the drawings in greater detail, FIG. 1 shows an exploded front view of an output panel extension system according to the present invention. Extension panels 1 include a means for representing data, for example display screen 2, which is supported by housing 3. Housing 3 has protrusion 4 on at least one end, to which is attached electrical connector 5. It should be noted that connector 5 is any conventional connector that can be used to electrically connect the extender 1 to the main unit 6 and it can be positioned at any location on 4 where it will work in the intended manner. Extension panel 1 is physically attached to main output panel 6 by sliding protrusion 4 into cylinder 7.

Note that FIG. 1 shows extension panel 1 attached to the sides of main output panel 6, however, extension panel 1 may be similarly attached to the top or the bottom of main output panel 6. Electrical connector 5 is secured to housing 3 in any conventional manner, and mating electrical connector 8 is secured in cylinder 7 in any conventional manner, so that power and/or data may be transferred from main output panel 6 to extension panel 1. A user merely has to insert protrusion 4 into cylinder 7 until a secure fit is obtained, simultaneously allowing electrical connectors 5 and 8 to engage each other.

In order to prevent dust and debris from entering cylinder 7 when it is not in use, it may be equipped with a means for dosing the top or side. The means may be a plastic or rubber plug, 18, or a spring biased sliding mechanism. The spring biased sliding mechanism may be similar to a conventional sliding mechanism on a diskette that protects the inner components of the diskette. The force of the spring keeps the cover over cylinder 7, and requires resistance in order to move the cover so cylinder 7 can be accessed.

Figure 3:
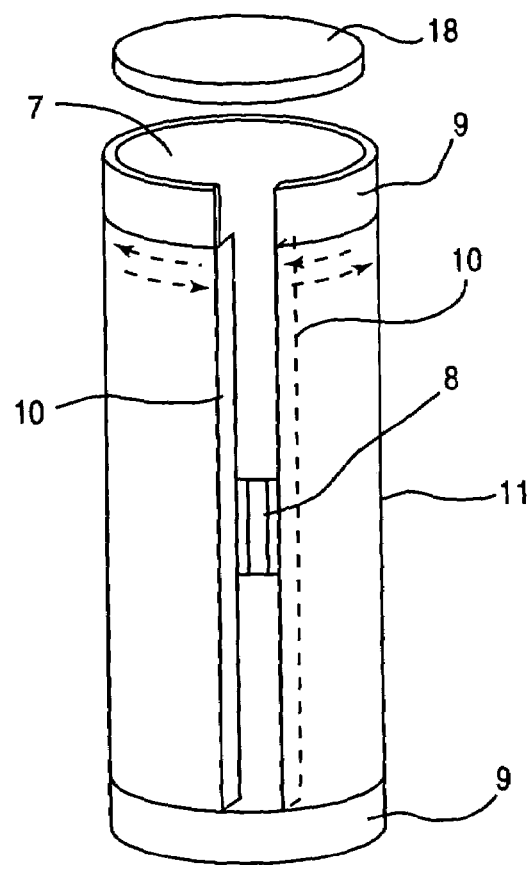
FIG. 3 shows a cylindrical swivel slot used with the present invention.

Extension panel 1 may also have built-in storage compartments 20 on the back, providing places for storing documents, diskettes, CD's, DVD's or other common items. As shown in FIGS. 1 and 3, a plug 18, which has dimensions similar to cylinder 7 is inserted into cylinder 7, and will be held there by friction. A handle can be placed on plug 18 to make it easier to insert and remove plug 18.

Figure 2:
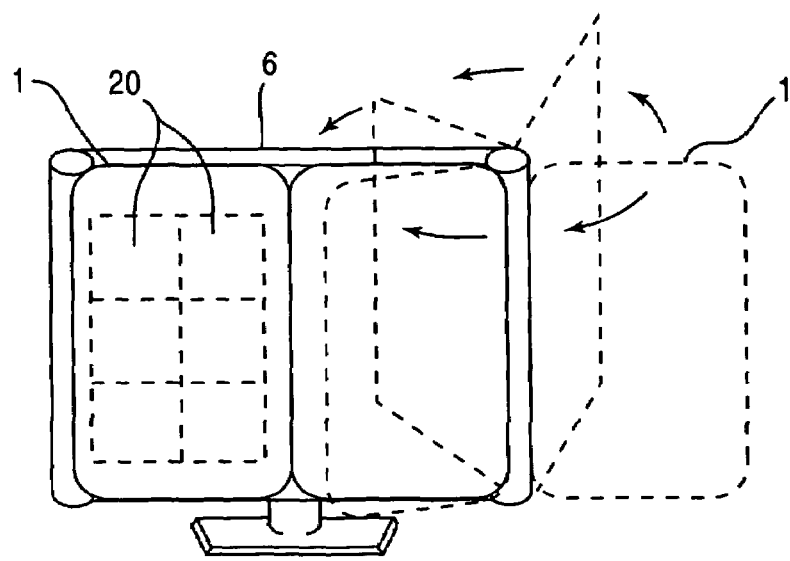
FIG. 2 shows the system of FIG. 1 in a dosed condition.

FIG. 2 shows the system of FIG. 1 with the extender on the left side in a dosed condition. The extender 1 on the right side is shown in several positions (shown in dotted lines) to illustrate the extenders can be placed in a variety of positions.

In FIG. 3, cylinder 7 is shown in a partial view separated from the main screen 6. The cylinder 7 allows the extension panels 1, once they are inserted into the cylinder 7, to swivel with respect to the main unit 6. As shown in FIG. 3, the cylinder 7 is made of a plurality of elements. Bands 9 are positioned at the top and bottom of the cylinder, and a sleeve 11 is connected, by any conventional means, between the bands 9. The sleeve 11 rotates (as shown by the arrows) with respect to the bands 9. Guides 10 are slots extending through sleeve 11 and are used to guide protrusion 4 into cylinder 7. Element 11 is moveable with respect to elements 9. An electrical connector 8 is present on the inside of cylinder 7, so that power and/or data may be transferred from main output panel 6 to the extension panels 1. Connector 8 is shown as a single rectangular connector on the inside of sleeve 11, however it can be any shape which will allow the connector to work in the intended manner. For example, it could be a band that extends completely around the inner surface of sleeve 11. Therefore, any position that extender 1 is rotated into, connector 5 will engage connector 8.

Figure 4:
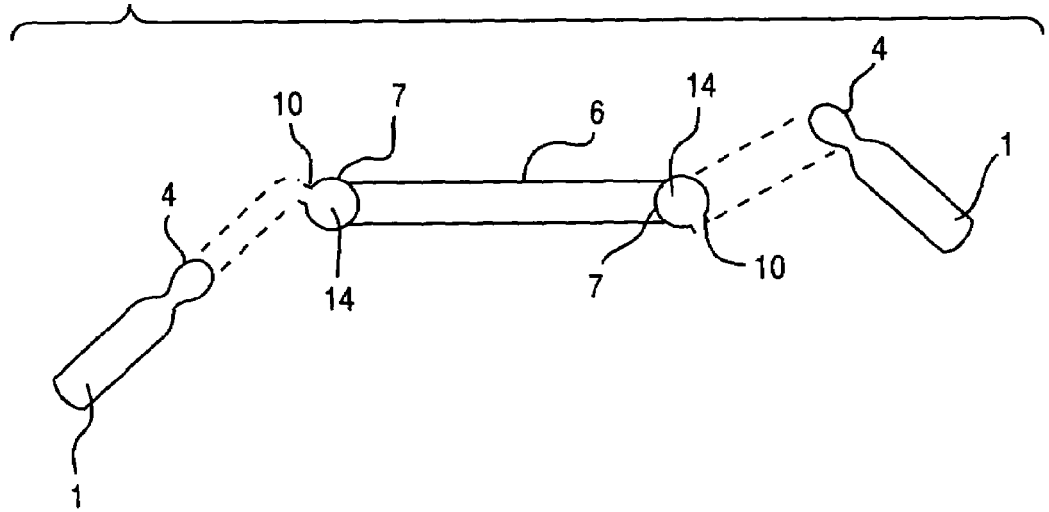
FIG. 4 shows an exploded top view of an output panel extension system.

FIG. 4 shows a top view of an output panel extension system using cylinder 7. In the case of dual side extension panels 1, each extension panel 1 may be approximately half the width of main output panel 6, thus enabling extension panels 1 to completely cover main output panel 6, when the extensions 1 are pivoted into a "dosed position". If a single output panel extension 1 is used, it can be designed to be the same width as panel 6, and thus cover main output panel 6 in its entirety when extension 1 is pivoted into a "dosed position".

Extension panel 1 may receive power from communication between the electrical connector 5 on housing 3 and electrical connector 8 in cylinder 7. However, panel 1 may be powered in other ways. For example, panel 1 can be connected through a proxy connection via either the power source of main output panel 6, a battery, a universal serial bus connection directly into a main computer, or a power source connecting directly into an outlet socket. If a power method other than the point of contact between connector 5 and connector 8 is used, then the means of attachment would serve only as a connector or holder for extension panel 1. In this case the power source would have to come from another method such as a USB or similar type connection (from extension panel 1 to a main computer), a batty or a direct power cord connection from an electrical socket. In essence, the CPU, hard drive and memory (intelligence) of a computer will send the graphic user interface not only to main output panel 6, but to extension panel 1 when coordinated with a software program.

Figure 5:
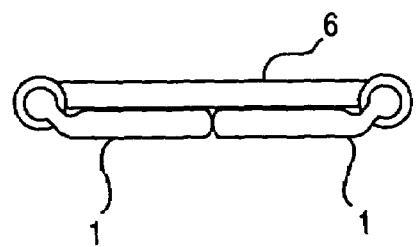
FIG. 5 shows a top view of the FIG. 4 system in a dosed condition.

FIG. 5 shows extension panels 1 in a dosed position where they cover the entire screen 6.

Figure 6:
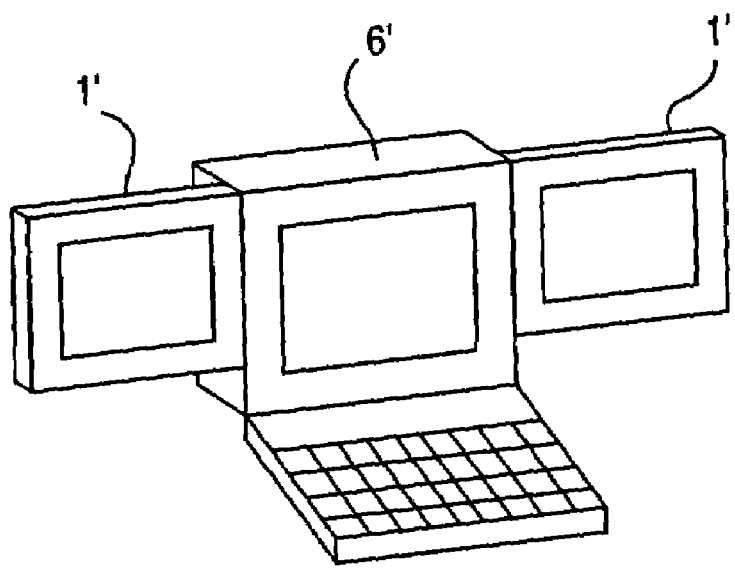
FIG. 6 depicts a front view of another output panel extension system.

FIG. 6 shows extension panels 1' stored inside of main output panel 6' and projecting out from main output panel 6' via a sliding connection between extension panels 1' and output panel 6'. A slot 15 may be provided in a portion of panel 6' which will accept sliding extensions 1' (see FIG. 7). The slots 15 can have electrical connectors 16 which will supply power and data to extensions 1' by means of any conventional flexible connection 17. The extensions 1' may be powered from the power source for panel 6', or they could be supplied with their own power supply.

Figure 7:
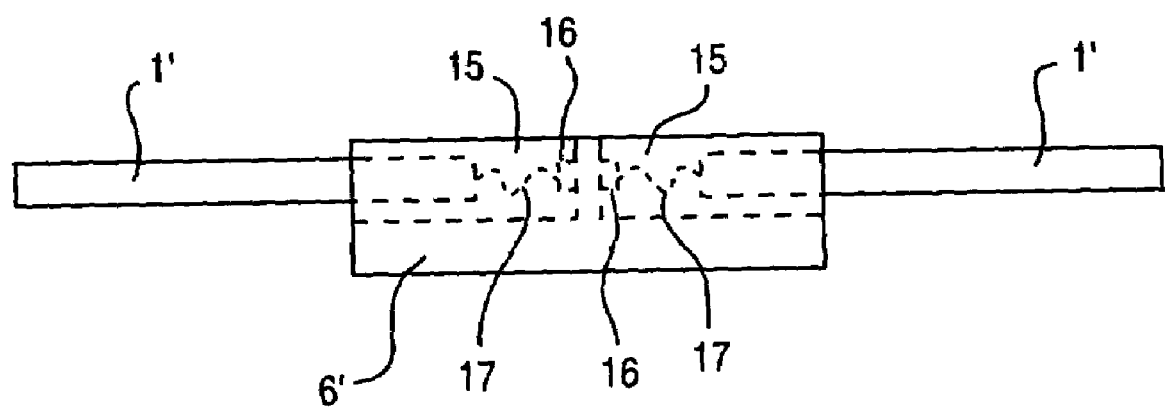
FIG. 7 depicts a top view of the FIG. 6 output panel extension system

FIG. 7 is a top view of the device shown in FIG. 6. Extension panels 1' are shown partially slid out from panel 6'. The panels 1' may slide into separate slots 15 or they may slide into a single slot 15.

Although FIGS. 6 and 7 show extension panels 1" projecting out from the side of main panel 6", a similar design could be used to project an extension panel 1" out of the top of main panel 6".

In order to use the present invention, the user attaches extension panel(s) 1 to a main panel 6 by inserting protrusion 4 into cylinder 7, until the connectors 5, 8 engage. If multiple extension panels 1 are desired, the user similarly attaches another extension panel 1 into cylinder 7 on the other side of main panel 6. Once protrusion 4 is fully engaged in cylinder 7, electrical connectors 5 and 8 are engaged, allowing power and/or data transfer to occur between main output panel 6 and extension panels 1. Extension panels 1 are now ready to provide additional data representation capability.

When not in use, the user may pivot extension panel 1 about the attachment point and pivot extension panel 1 to cover the front of main panel 6, or pivot extension panel 1 to cover the back of main panel 6, or remove extension panel 1 altogether for separate storage.

The FIG. 6 device operates in essentially the same manner. The user slides extension panel 1' out of main output panel 6'. This may be performed manually, or alternatively, could be accomplished by pushing a button to activate a mechanism to slide extension panel 1' out of its storage compartment inside of main output panel 6'. Extension panel 1' may then be used to present data. When the user no longer requires extension panel 1', he or she slides extension panel 1' back inside of main output panel 6', or alternatively, removes extension panel 1'.

Although the output panel extension system has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. An output panel extension system comprising:
   a main output panel,
   said main output panel having at least one edge,
   at least one extension panel,
   said extension panel comprising means for displaying data, and
   said extension panel having a housing, which supports said means for displaying data,
   means for supplying power to said at least one extension panel,
   means for supply data to said at least one extension panel,
   means for removably attaching said at least one extension panel to said main output panel, and
   wherein said means for removably attaching said at least one extension panel is a projection on said at least one extension panel, and a cylinder on said main output panel, and
   wherein said projection and said cylinder contain complimentary electrical connectors.

2. The output panel extension system as claimed in claim 1, wherein said system has a plurality of said extension panels.

3. The output panel extension system as claimed in claim 1, wherein said system has means for preventing unwanted debris from entering said cylinder.

4. The output panel on system as claimed in claim 3 wherein said means for preventing unwanted debris from entering said cylinder is a plug approximately the same size as said cylinder.

5. The output panel extension system as claimed in claim 1, wherein said cylinder in said main output panel is circular.

6. The output panel on system as claimed in claim 1, wherein said means for removably attaching said at least one extension panel is a projection on said at least one extension panel, and a cylinder on said main output panel, and
   said cylinder comprises a band at atop and bottom of said cylinder and a sleeve extending between and being connected to said bands.

7. The output panel extension system as claimed in claim 6, wherein said sleeve and said bands are rotatably connected.

8. The output panel exon system as claimed in claim 1, wherein said means for removably attaching said at least one extension panel to said main output panel comprises at least one slot in said main output panel, and
   said at least one extension panel fits into said at let one slot, and
   said at least one extension panel and said main output panel have means for electrically interconnecting said at least one extension panel and said main output panel.

9. The output panel extension system as claimed in claim 8, wherein at least a portion of said at least one extension panel fits into said at least one slot.

10. The output panel extension system as claimed in claim 8, wherein said means for electrically interconnecting said at least one extension panel and said main output panel is a flexible connection.

11. The output panel extension system as claimed in claim 8, wherein said at least one extension panel slides into and out of said at least one slot.

* * * * *